US011724725B2

(12) United States Patent
Dixon et al.

(10) Patent No.: US 11,724,725 B2
(45) Date of Patent: Aug. 15, 2023

(54) GRADE ADJUSTED COMPENSATION FOR SLIP OR SLIDE CONDITION

(71) Applicant: Siemens Mobility, Inc., New York, NY (US)

(72) Inventors: Timothy Dixon, Trafford, PA (US); Raymund Novak, Allison Park, PA (US); Meng Ju Vincent Lu, Cranberry Township, PA (US); Scott Novak, Long Island City, NY (US)

(73) Assignee: Siemens Mobility, Inc., New York, NY (US)

( * ) Notice: Subject to any disclaimer, the term of this patent is extended or adjusted under 35 U.S.C. 154(b) by 381 days.

(21) Appl. No.: 17/159,818

(22) Filed: Jan. 27, 2021

(65) Prior Publication Data

US 2022/0234633 A1 Jul. 28, 2022

(51) Int. Cl.
*B61L 25/00* (2006.01)
*B61L 25/02* (2006.01)
*B60T 8/1761* (2006.01)
*B60T 8/24* (2006.01)
*B60T 8/17* (2006.01)
*B61C 15/08* (2006.01)

(52) U.S. Cl.
CPC .......... *B61L 25/021* (2013.01); *B60T 8/1705* (2013.01); *B60T 8/1761* (2013.01); *B60T 8/245* (2013.01); *B60T 2250/04* (2013.01); *B60T 2250/042* (2013.01); *B61C 15/08* (2013.01)

(58) Field of Classification Search
CPC ....................... B60T 2250/04; B60T 2250/042
See application file for complete search history.

(56) References Cited

U.S. PATENT DOCUMENTS

| | | | | |
|---|---|---|---|---|
| 4,065,975 A | * | 1/1978 | Giessner | G01P 7/00 73/510 |
| 4,164,872 A | * | 8/1979 | Weigl | B60L 3/104 318/52 |
| 4,561,057 A | * | 12/1985 | Haley, Jr. | B60L 3/12 360/6 |
| 5,186,049 A | * | 2/1993 | Shannon | G01C 9/06 73/146 |
| 5,659,137 A | | 8/1997 | Popp | |
| 2008/0051967 A1 | * | 2/2008 | Tarnow | B60L 3/10 701/71 |
| 2016/0238628 A1 | * | 8/2016 | Maier | G01M 99/004 |

* cited by examiner

*Primary Examiner* — Eric S. McCall

(57) ABSTRACT

A system for measuring motion of a locomotive vehicle includes a speed sensor, a decelerometer and an onboard processing unit. The speed sensor is configured to measure wheel speed of the locomotive vehicle. The decelerometer includes a level-sensitive device configured to measure acceleration or deceleration of the locomotive vehicle as a function of a tilt from a level position. The onboard processing unit computes a current grade traversed by the locomotive vehicle prior to detection of a slip or slide condition based on a first measurement signal from the decelerometer. Upon detection of the slip or slide condition, the onboard processing unit obtains a second measurement signal from the decelerometer and filters out the current grade from the second measurement signal. The onboard processing unit determines an actual acceleration or deceleration of the locomotive vehicle during the slip or slide condition from the filtered second measurement signal from the decelerometer.

17 Claims, 2 Drawing Sheets

GRADE ADJUSTED COMPENSATION FOR SLIP OR SLIDE CONDITION

TECHNICAL FIELD

The present disclosure relates to locomotive control, and in particular, to a technique to accurately measure motion of a locomotive vehicle during a slip or slide condition.

BACKGROUND

A locomotive vehicle in motion may encounter low adhesion conditions such as ice or wet leaves on the rail that cause the wheels to lose traction and lock up, causing a "slide" condition. During this condition, a speed sensor attached to the wheels of the locomotive will be unable to measure either the distance the locomotive is traveling or the speed at which is it moving. A second condition, referred to as "slip", can be caused, for example, when extremely high torque is applied at low or no speed causing a sharp spike in the speed sensor reading which would falsely indicate a huge change in speed, and consequently, position or location.

In the case of both slip and slide conditions, the onboard processing unit is unable to accurately determine the speed or distance traversed by the locomotive, thus rendering its calculations of braking and alert curves unreliable until such time as the speed and location can be accurately determined.

SUMMARY

Briefly, aspects of the present disclosure relate to a technique to accurately measure motion of a locomotive vehicle during a slip or slide condition by providing grade adjusted compensation.

A first aspect of the disclosure provides a system for measuring motion of a locomotive vehicle. The system comprises a speed sensor configured to measure wheel speed of the locomotive vehicle and a decelerometer including a level-sensitive device configured to measure acceleration or deceleration of the locomotive vehicle as a function of a tilt from a level position. The system further comprises an onboard processing unit. The onboard processing unit is configured to compute a current grade traversed by the locomotive vehicle prior to detection of a slip or slide condition based on a first measurement signal from the decelerometer. The onboard processing unit is configured to detect a slip or slide condition based on a measurement signal from the speed sensor. Upon detection of the slip or slide condition, the onboard processing unit is configured to obtain a second measurement signal from the decelerometer, filter out the current grade from the second measurement signal of the decelerometer, and determine an actual acceleration or deceleration of the locomotive vehicle during the slip or slide condition from the filtered second measurement signal from the decelerometer.

A second aspect of the disclosure provides a method for measuring motion of a locomotive vehicle. The method comprises computing a current grade traversed by the locomotive vehicle prior to detection of a slip or slide condition based on a first measurement signal from the decelerometer. The decelerometer includes a level-sensitive device configured to measure acceleration or deceleration of the locomotive vehicle as a function of a tilt from a level position. The method further comprises detecting a slip or slide condition based on a measurement signal from the speed sensor, the speed sensor configured to measure wheel speed of the locomotive vehicle. Upon detection of the slip or slide condition, the method comprises obtaining a second measurement signal from the decelerometer, filtering out the current grade from the second measurement signal of the decelerometer, and determining an actual acceleration or deceleration of the locomotive vehicle during the slip or slide condition from the filtered second measurement signal from the decelerometer.

A further aspect of the disclosure embodies features of the above-described method in a computer program product.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Figure 1:
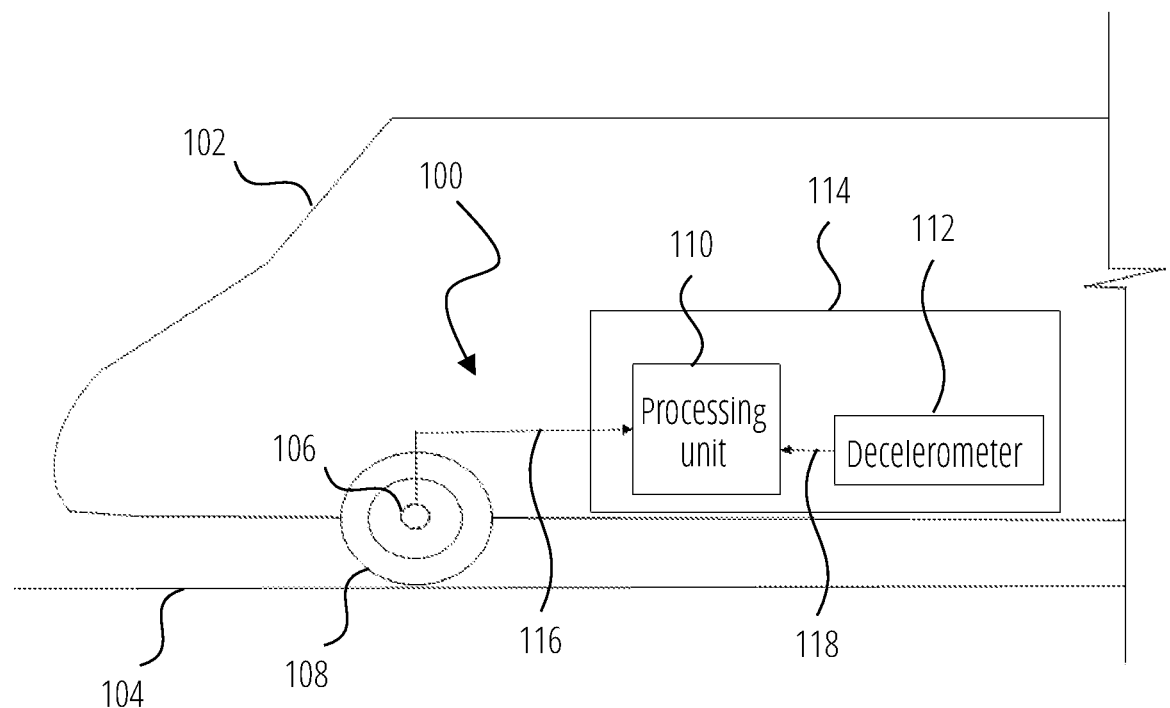
FIG. 1 is a schematic diagram of a system for measurement of motion of a locomotive vehicle according an embodiment of the disclosure.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Turning now to the drawings, FIG. 1 illustrates a system 100 for measurement of motion of a locomotive vehicle 102 along a railway track 104. The system 100 includes at least one speed sensor 106 configured for measuring rotational wheel speed of a locomotive wheel 108. In one embodiment, the speed sensor 106 may comprises a shaft encoder or an equivalent device mounted on a wheel axle. The speed sensor 106 provides a measurement signal 116 indicative of wheel speed to an onboard processing unit 110. The measurement signal 116 may indicate, for example, the pulses per revolution measured by the shaft encoder. The onboard processing unit 110 comprises one or more processors configured to execute computer readable instructions. In one embodiment, the processing unit 110 is embodied as part of a positive train control (PTC) system, an example of which is the product ACSES' manufactured by Siemens Mobility Inc. The onboard processing unit 110 comprises logic processes that utilize the measurement signal 116 from the speed sensor 106 to determine the linear speed, and in dependence thereof, the position or location of the locomotive vehicle 102, under normal operation (i.e., in the absence of a slip or a slide condition).

A slide condition refers to the locking up of a locomotive wheel or rotation of a locomotive wheel at a rotational speed less than the rotational speed corresponding to the actual linear vehicle speed. A slide condition typically occurs during vehicle deceleration but may potentially occur during vehicle acceleration. During a slide condition, the locomotive wheels typically lock up under low adhesion, for example, on ice or wet leaves, whereby the speed sensor 106 reports a much lower apparent speed than the locomotive is actually traveling at. This means the locomotive's actual speed could temporarily go over the allowed speed without penalty or alert, and the location will no longer be highly accurate until the next transponder set is crossed.

A slip condition refers to the rotation of a locomotive wheel at a rotational speed greater than the rotational speed corresponding to the actual linear vehicle speed. During a slip condition, usually at initial acceleration, the locomotive wheels slip, or spin under high torque and low speed conditions, resulting in a very high speed reported by the speed sensor 106. This could lead to an improper alert, or even penalty, and the location is also not reliable until the next transponder is read.

The detection of slip and slide conditions are vital for maintaining both accurate speed determination and location details for a locomotive vehicle. Both of these elements serve as important inputs into a PTC system.

As per the disclosed embodiment, the measurement signal 116 from the speed sensor 106 is used by the onboard processing unit 110 to detect a slip or a slide condition. Once a slip or slide condition occurs, the measurement signal 116 from the speed sensor 106 can no longer be used to accurately determine vehicle speed and location. Under these conditions, a decelerometer 112 is used to give an accurate estimate of the actual speed of the locomotive vehicle 102, thus leading to an accurate estimate of the location as well.

The decelerometer 112 includes a level-sensitive device capable of measuring inertial deceleration and acceleration of the locomotive vehicle 102 as a function of tilt from a level position. The decelerometer 112 is located onboard locomotive vehicle 102, typically (but not necessarily) in a common enclosure 114 with the onboard processing unit 110, and is ordinarily used to measure the braking force used to slow down or stop the locomotive vehicle 102. When activated, the decelerometer 112 produces a measurement signal 118 that is not only sensitive to the inertial acceleration or deceleration, but also to the grade that the locomotive vehicle 102 is currently traversing. A level-sensitive onboard decelerometer of the above-mentioned type is typically employed in conjunction with wayside units for signaling purposes, which compensate for distance based on grade. However, for the same reasons, using the input from the above-described decelerometer directly to estimate the vehicle speed and location during a slip or slide condition may potentially lead to inaccuracies.

According to aspects of the present disclosure, the measurement signal 118 from the decelerometer 112 is processed to compensate for grade, to improve the accuracy in the estimation of speed and location of the locomotive vehicle 102 during a slip or slide condition.

Figure 2:
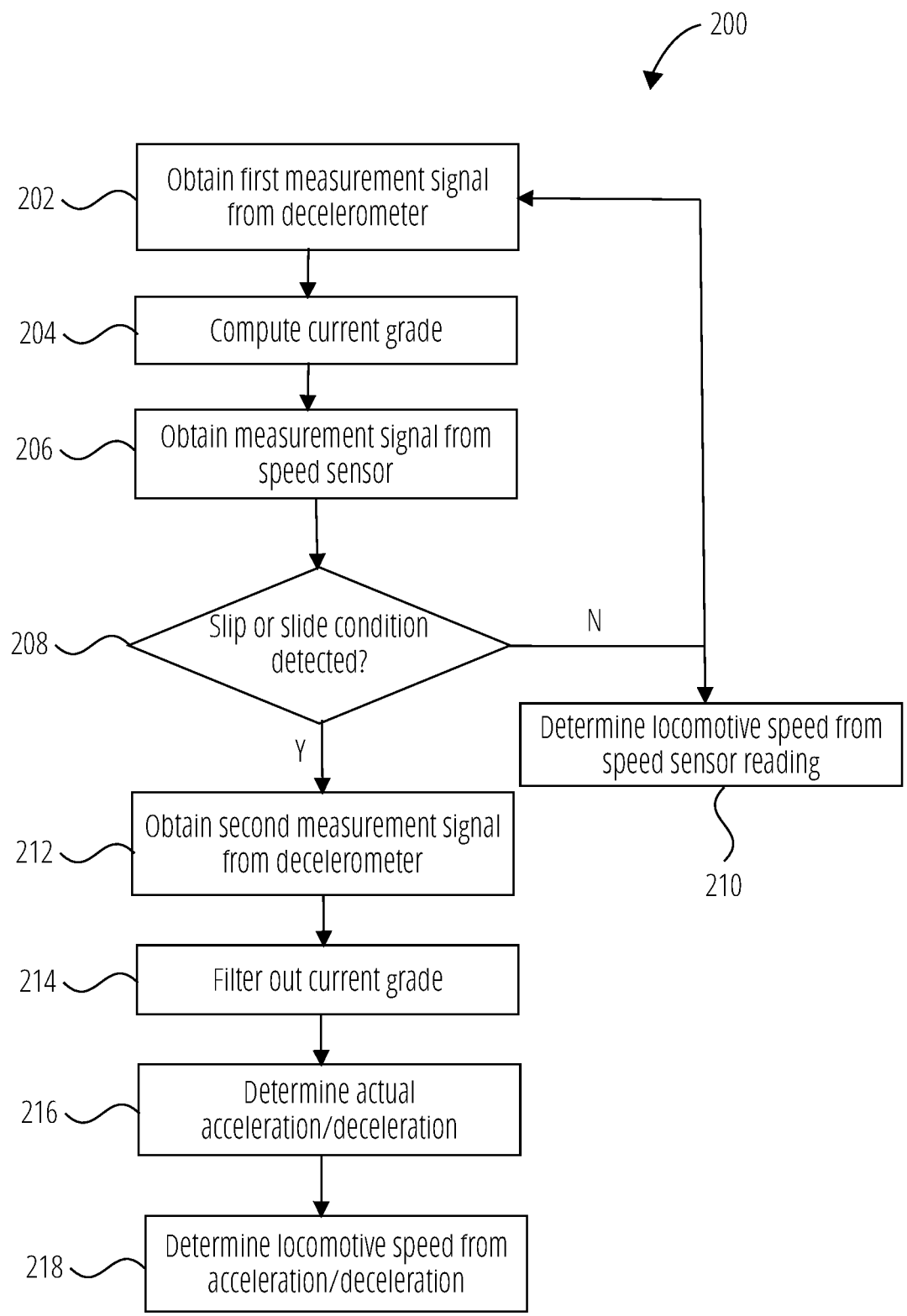
FIG. 2 is a flowchart illustrating a method for measurement of motion of a locomotive vehicle according an embodiment of the disclosure.

FIG. 2 is a flowchart illustrating a method 200 in accordance with disclosed embodiments that can be performed by the onboard processing unit 110 shown in FIG. 1 or another device. FIG. 2 is not intended to indicate that the operational blocks of the method 200 are to be executed in any particular order, or that all of the blocks of the method 200 are to be included in every case. Additionally, the method 200 can include any suitable number of additional operations. In some embodiments, one or more operational blocks of the method 200 may be embodied in a computer program product.

Block 202 involves obtaining a first measurement signal from the decelerometer 112 during normal operation of the locomotive vehicle 102, i.e., prior to detection of a slip or slide condition.

Block 204 involves computing a current grade traversed by the locomotive vehicle 102 based on the first measurement signal from the decelerometer 112. The current grade is computed when the locomotive vehicle 102 is stationary or in motion at a constant speed. Under this condition, since the decelerometer 112 does not sense any dynamic acceleration or deceleration, the first measurement signal is sensitive solely to the geographical topology or grade of the railway track 104. The current grade may be a current running grade (CRG) measured when the locomotive vehicle 102 is moving at a constant speed or current standing grade (CSG) measured when the locomotive vehicle 102 is stationary. CSG is typically used for grade compensation when the locomotive vehicle 102 encounters a slip while moving from stop under very slippery conditions. In one embodiment, the current grade is continuously computed and updated over a rolling time window during normal operation (including when the vehicle is stationary). The CSG or CRG will thus be indicative of the geographical topography value over the last period of time (e.g., the last 5 seconds). As mentioned, the CRG is computed when the locomotive vehicle 102 is moving at constant speed. If accelerating or decelerating, the most recently computed CRG is retained as the current grade.

In one embodiment, at block 204, the processing unit 110 uses a standard moving average (boxcar) filter to collect CRG measurements over a period of time. A new measurement signal from the decelerometer 112 may be received, for example, every 100 millisecond logic cycle. While the locomotive vehicle 102 is in motion at a constant speed, these measurement signals may be saved to the boxcar filter over a defined timespan (e.g., 5 seconds) for a total maximum number (e.g., 50) of saved measurements at any time.

Block 206 involves obtaining a measurement signal from the speed sensor 106. As mentioned, the measurement signal may be indicative, for example, of the number of wheel pulses per revolution measured by the speed sensor 106.

At block 208, the measurement signal from the speed sensor 106 is utilized to determine whether a slip or a slide condition has occurred. A slide condition may be detected when a steep decrease in wheel speed is determined from the measurement signal obtained from the speed sensor 106. For example, a slide condition may be determined if the wheel deceleration is greater than a defined threshold deceleration. A slip condition may be detected when a steep increase in wheel speed is determined from the measurement signal obtained from the speed sensor 106. For example, a slip condition may be determined if the wheel acceleration is greater than a defined threshold acceleration.

If, at block 208, a slip or slide condition is not detected (i.e., a normal operation is determined), control moves to block 210, in which the speed of the locomotive vehicle 102 is computed from the speed sensor reading. The preceding operational blocks are repeated.

If, at block 208, a slip or slide condition is detected, the PTC is alerted to ignore the pulse readings from the speed sensor 106, and control moves to block 212. Block 212 involves obtaining a second measurement signal from the decelerometer 112 during the slip or slide condition. Under this condition, the second measurement signal from the decelerometer 112 is sensitive both to the inertial acceleration/deceleration and to the grade traversed by the locomotive vehicle 102.

Block 214 involves filtering out the most recently computed current grade from the second measurement signal obtained from the decelerometer 112. For example, in one embodiment, when the processing unit 110 needs to use the grade adjusted acceleration/deceleration it may take the difference of the current second measurement signal from the decelerometer 112 and the previously saved CRG moving average from the boxcar filter. The resulting output is the grade adjusted measurement. Thereby, the reading from the decelerometer 112 is refined to measure only the acceleration or deceleration component of the current reading and not the grade or geographical topography.

Next, at block 216, the actual acceleration or deceleration of the locomotive vehicle 102 during the slip or slide condition is determined from the filtered second measurement signal from the decelerometer 112.

Finally, at block 218, the speed of the locomotive 102 during the slip or slide event is determined as a time integral of the computed actual acceleration/deceleration.

In one embodiment, the acceleration/deceleration, and resultantly, the speed of the locomotive vehicle, are computed in pulse-per-revolution from the filtered second measurement signal from the decelerometer 112, to generate a data stream that substitutes for the speed sensor reading during the slip or slide event for the logic processes employed by the PTC system.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

The computer readable storage medium can include a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions described herein can be downloaded to respective computing/processing devices from a computer readable storage medium or to an external computer or external storage device via a network, for example, the Internet, a local area network, a wide area network and/or a wireless network.

The system and processes of the figures are not exclusive. Other systems and processes may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the disclosure.

What is claimed is:

1. A system for measuring motion of a locomotive vehicle, comprising:
    a speed sensor configured to measure wheel speed of the locomotive vehicle,
    a decelerometer including a level-sensitive device configured to measure acceleration or deceleration of the locomotive vehicle as a function of a tilt from a level position, and
    an onboard processing unit configured to:
        compute a current grade traversed by the locomotive vehicle prior to detection of a slip or slide condition based on a first measurement signal from the decelerometer,
        detect a slip or slide condition based on a measurement signal from the speed sensor,
        upon detection of the slip or slide condition, obtain a second measurement signal from the decelerometer,
        filter out the current grade from the second measurement signal of the decelerometer, and
        determine an actual acceleration or deceleration of the locomotive vehicle during the slip or slide condition from the filtered second measurement signal from the decelerometer.

2. The system of claim 1, wherein the current grade is a current running grade computed based on the first measurement signal from the decelerometer when the locomotive vehicle is in motion at a constant velocity.

3. The system of claim 1, wherein the current grade is a current standing grade computed based on the first measurement signal from the decelerometer when the locomotive vehicle is stationary.

4. The system of claim 1, wherein the onboard processing unit is configured to continuously compute and update the current grade based on the first measurement signal from the decelerometer over a rolling time window.

5. The system of claim 1, the onboard processing unit is configured to detect a slide condition from the measurement signal from the speed sensor when a steep decrease in speed is determined.

6. The system of claim 1, the onboard processing unit is configured to detect a slip condition from the measurement signal from the speed sensor when a steep increase in speed is determined.

7. The system of claim 1, wherein the onboard processing unit is configured to determine a speed of the locomotive vehicle during the slip or slide condition from the determined actual acceleration and deceleration.

8. The system of claim 7, wherein the onboard processing unit is configured to compute the speed of the locomotive vehicle during the slip or slide condition from the determined actual acceleration and deceleration in pulse-per-revolution, to generate a data stream that substitutes speed sensor readings after the slip or slide condition is detected.

9. A method for measuring motion of a locomotive vehicle, comprising:
    computing a current grade traversed by the locomotive vehicle prior to detection of a slip or slide condition based on a first measurement signal from the decelerometer, the decelerometer including a level-sensitive device configured to measure acceleration or deceleration of the locomotive vehicle as a function of a tilt from a level position, detecting a slip or slide condition based on a measurement signal from the speed sensor, the speed sensor configured to measure wheel speed of the locomotive vehicle, upon detection of the slip or slide condition, obtaining a second measurement signal from the decelerometer, filtering out the current grade from the second measurement signal of the decelerometer, and determining an actual acceleration or deceleration of the locomotive vehicle during the slip or slide condition from the filtered second measurement signal from the decelerometer.

10. The method of claim 9, wherein the current grade is a current running grade computed based on the first measurement signal from the decelerometer when the locomotive vehicle is in motion at a constant velocity.

11. The method of claim 9, wherein the current grade is a current standing grade computed based on the first measurement signal from the decelerometer when the locomotive vehicle is stationary.

12. The method of claim 9, comprising continuously computing and updating the current grade based on the first measurement signal from the decelerometer over a rolling time window.

13. The method of claim 9, comprising detecting a slide condition from the measurement signal from the speed sensor when a steep decrease in speed is determined.

14. The method of claim 9, comprising detecting a slip condition from the measurement signal from the speed sensor when a steep increase in speed is determined.

15. The method of claim 9, comprising determining a speed of the locomotive vehicle during the slip or slide condition from the determined actual acceleration and deceleration.

16. The method of claim 15, comprising computing the speed of the locomotive vehicle during the slip or slide condition from the determined actual acceleration and deceleration in pulse-per-revolution, to generate a data stream that substitutes speed sensor readings after the slip or slide condition is detected.

17. A non-transitory computer-readable storage medium, the computer-readable storage medium including instructions that when executed by a processor, cause the processor to:

compute a current grade traversed by a locomotive vehicle prior to detection of a slip or slide condition based on a first measurement signal from a decelerometer, the decelerometer including a level-sensitive device configured to measure acceleration or deceleration of the locomotive vehicle as a function of a tilt from a level position, detect a slip or slide condition based on a measurement signal from a speed sensor, the speed sensor configured to measure wheel speed of the locomotive vehicle, upon detection of the slip or slide condition, obtain a second measurement signal from the decelerometer, filter out the current grade from the second measurement signal of the decelerometer, and determine an actual acceleration or deceleration of the locomotive vehicle during the slip or slide condition from the filtered second measurement signal from the decelerometer.

* * * * *